United States Patent [19]
Darrieux et al.

[11] Patent Number: 5,639,337
[45] Date of Patent: Jun. 17, 1997

[54] APPARATUS FOR THE FABRICATION OF FIBER COMPOSITES WITH A VITREOUS OR GLASS-CERAMIC MATRIX

[75] Inventors: Jean-Louis Darrieux; Guy Larnac, both of Saint Medard en Jalles, France

[73] Assignee: Aerospatiale Societe Nationale Industrielle, Societe Anonyme, Paris Cedex, France

[21] Appl. No.: 360,983

[22] Filed: Dec. 20, 1994

[30] Foreign Application Priority Data

Dec. 21, 1993 [FR] France .................... 93 15765

[51] Int. Cl.⁶ .................... B65H 81/00
[52] U.S. Cl. .................... 156/430; 56/169; 56/350; 56/431; 56/446; 65/446
[58] Field of Search .................... 65/442, 444, 453; 156/169, 173, 175, 430, 431, 350, 89, 425; 242/909

[56] References Cited

U.S. PATENT DOCUMENTS

| | | | |
|---|---|---|---|
| 2,939,761 | 6/1960 | Stein | 156/173 X |
| 3,112,897 | 12/1963 | Eshbaugh et al. | 156/425 X |
| 3,157,722 | 11/1964 | Moore | 156/89 X |
| 3,492,187 | 1/1970 | Hirtzer | 156/431 X |
| 3,519,520 | 7/1970 | Newman, Jr. | 156/173 X |
| 4,214,931 | 7/1980 | Wojciechowski | 156/425 X |
| 4,220,497 | 9/1980 | Carley . | |
| 4,369,934 | 1/1983 | Spies | 156/169 X |
| 4,583,929 | 4/1986 | Becker et al. . | |
| 4,960,451 | 10/1990 | Malinoski et al. . | |
| 4,976,761 | 12/1990 | Allaire . | |
| 5,256,230 | 10/1993 | Winkel | 156/169 X |

FOREIGN PATENT DOCUMENTS

| | | |
|---|---|---|
| 0117594 | 9/1984 | European Pat. Off. . |
| 0557140 | 8/1993 | European Pat. Off. . |
| 2041322 | 9/1980 | United Kingdom . |

OTHER PUBLICATIONS

French Search Report and Annex.

*Primary Examiner*—David A. Simmons
*Assistant Examiner*—M. Curtis Mayes
*Attorney, Agent, or Firm*—Greenblum & Bernstein P.L.C.

[57] ABSTRACT

Apparatus is provide for the fabrication of fiber composites composed of a fiber-reinforced vitreous or glass-ceramic matrix by winding fibers preimpregnated with constituents of the matrix onto a mandrel. The apparatus includes a furnace into which a winding mandrel can be introduced; elements for driving the mandrel in rotation around its axis inside the furnace; transit elements including a slot parallel to the axis of the mandrel positioned in the wall of the furnace for delivering fibers into the furnace; elements including a head for delivering fibers from supply spools positioned outside the furnace to the mandrel inside the furnace via the transit elements; and elements for actuating and controlling delivery of fibers and driving in rotation of the mandrel comprising elements for actuating and controlling the elements for driving the mandrel and the head for delivering the fibers as a function of winding parameters.

17 Claims, 4 Drawing Sheets

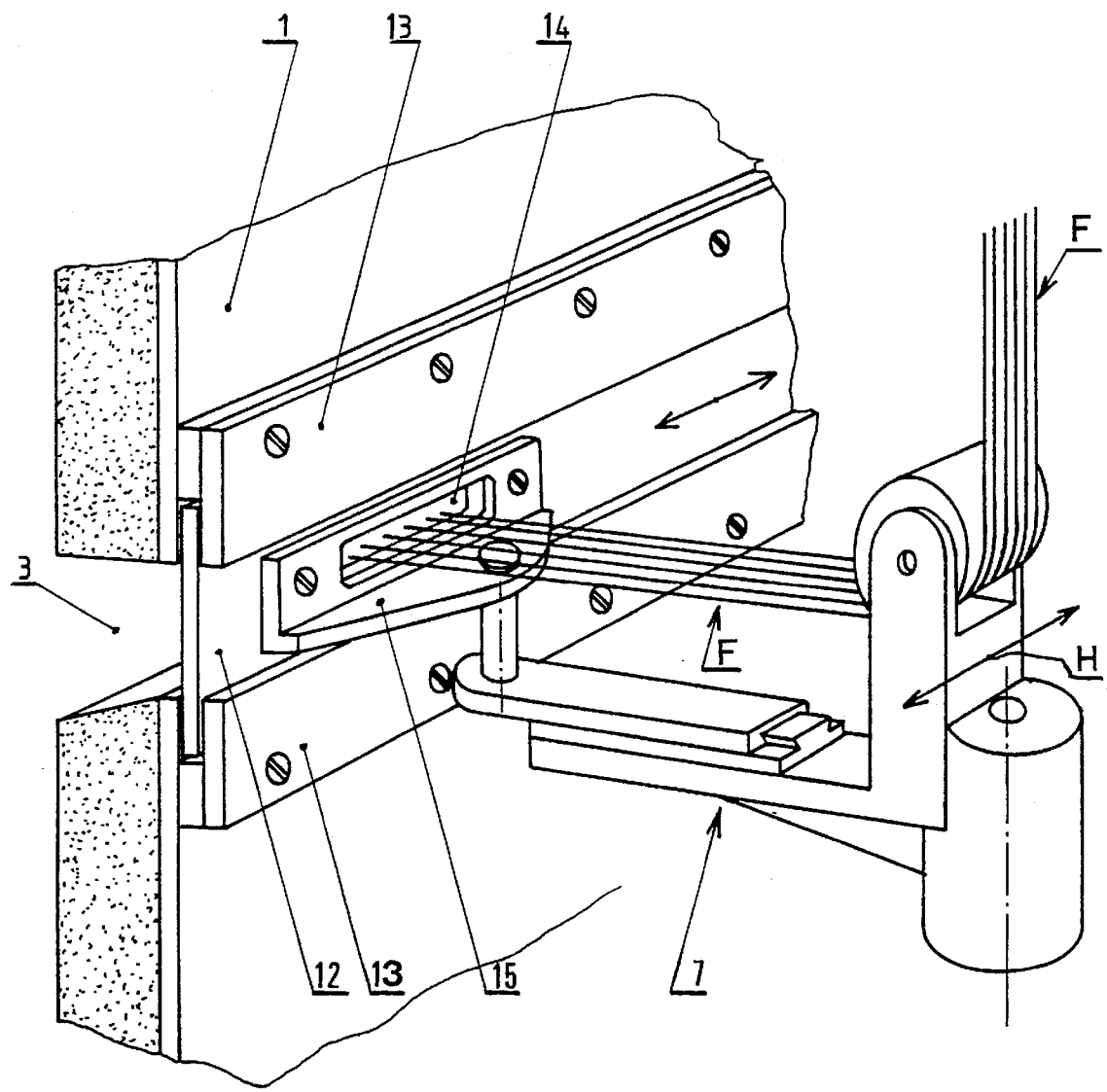
FIG_3a_

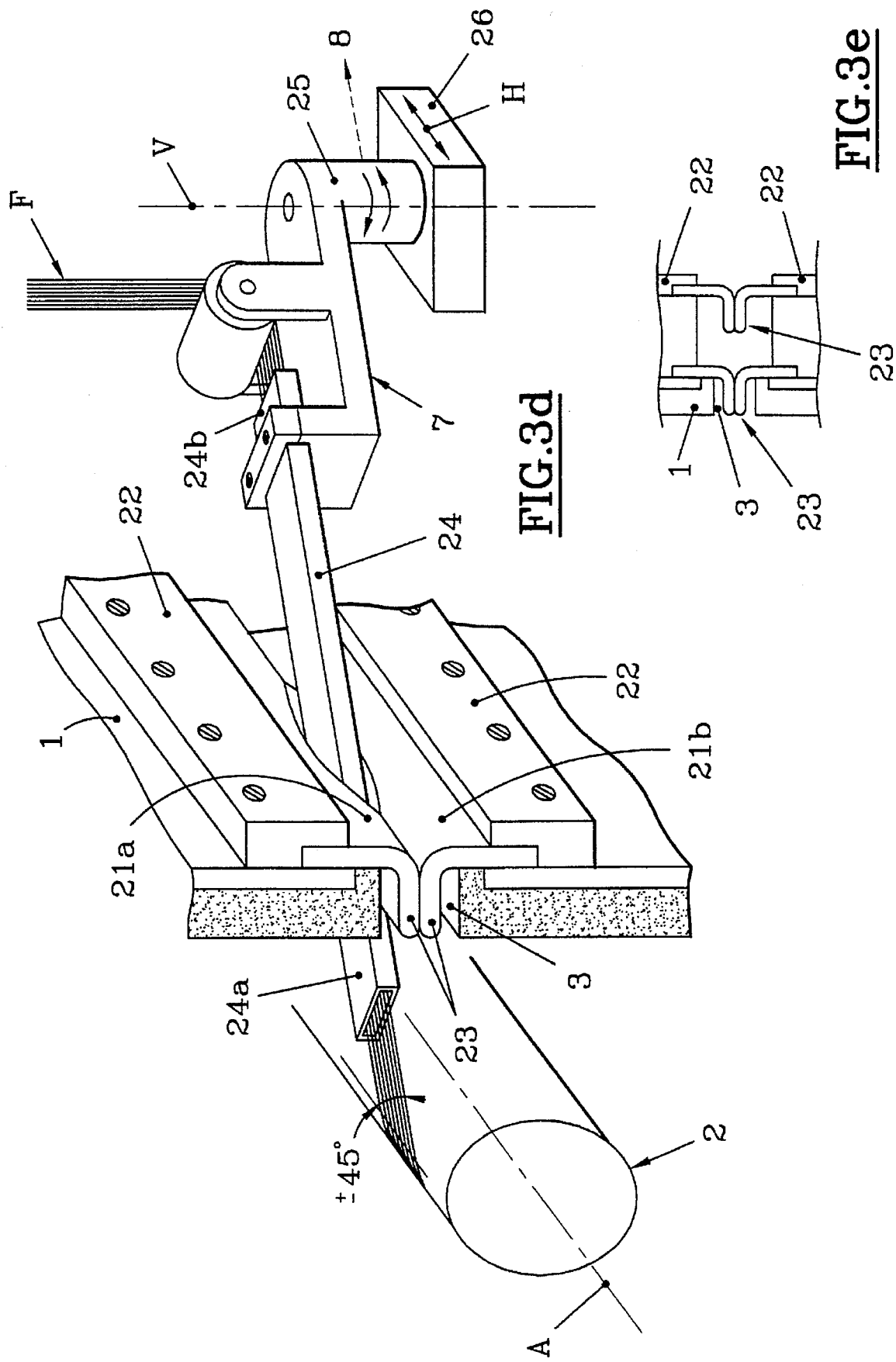

APPARATUS FOR THE FABRICATION OF FIBER COMPOSITES WITH A VITREOUS OR GLASS-CERAMIC MATRIX

BACKGROUND OF THE INVENTION

1. Field of the Invention

The present invention relates to the production of fiber composites with a fiber-reinforced vitreous or glass-ceramic matrix, and more precisely, of composites obtained through winding of preimpregnated fibers and rigidification by heat treatment.

Such materials, developed from fibers of silicon carbide or carbon, for example, are more particularly intended for applications in the aeronautics or space field, which require high temperature resistance, as well as in the field of mechanical stresses.

2. Discussion of Background Information

Two known techniques make it possible to obtain this type of composite.

In a first technique, these composites are produced by cold winding onto a mandrel that is appropriate for preimpregnated fibers, then the wound mandrel is placed into a furnace in order to soften the vitreous or glass-ceramic matrix, after which the material rigidifies during the cooling of the furnace.

This technique does not provide optimal compaction or homogeneity of the composite, because of the cold winding.

In a second technique described in European patent application No. 0 557 140, which was filed in the name of the present assignee, the preimpregnated fibers are deposited onto the mandrel with the aid of a pressure roller in front of which localized heating takes place in order to melt the subjacent vitreous matrix onto which the fibers are pressed.

The disadvantages of this process lie in the impossibility of tightening the fibers during their deposition and in the fact that the composite undergoes, during the entire deposition, a local thermal shock that is detrimental to the quality of the ceramicization of the matrix.

On the other hand, from U.S. Pat. No. 4,976,761, an installation is known that is intended for tension-winding of preimpregnated fibers onto a mandrel disposed inside a furnace. To this end, the pre-heated fibers are delivered at a controlled tension and at a fixed point which faces an opening of the furnace inside which the mandrel is driven in rotation and can be axially displaced.

Even if such an apparatus makes it possible to obtain composites under conditions which assure good compactness and a good ceramicization of the matrix, it is not suitable for winding either elongated pieces or fibers at angles that are substantially less than 90° in relation to the axis of the mandrel.

In fact, since the delivery of the fibers is effected in a manner that is stationary and roughly orthogonal to the axis of the mandrel, it precludes the winding of a mandrel of relatively considerable length, because that would require a furnace of excessive size, since the mandrel must roll from one end to the other in front of the opening through which the fibers enter the furnace. It is completely impossible to wind fibers at angles that are substantially less than 90°, since the mandrel can be displaced only axially, that is, orthogonally to the fibers entering the furnace.

SUMMARY OF THE INVENTION

The present invention seeks to reduce the disadvantages of such an apparatus by proposing suitable means for assuring, under similar tension and temperature conditions, the winding of mandrels which can have considerable length and/or the deposition of fibers at variable angles.

To this end, the object of the invention is to provide an apparatus for the fabrication of fiber composites with fiber-reinforced vitreous or glass-ceramic matrices by means of winding fibers which have been preimpregnated with this matrix onto a mandrel, which includes a furnace equipped with access means for inserting and withdrawing a winding mandrel, means for driving the mandrel in rotation around its axis inside the furnace, means for delivering fibers from supply spools disposed outside the furnace to the mandrel inside the furnace, via a passage means disposed in the wall of this furnace and means for actuating and controlling the delivery of the fibers and the driving in rotation of the mandrel. The apparatus is characterized in that it includes:

- a passage means for the fibers located in the wall of the furnace, constituted by a slot running parallel to the axis of the mandrel,
- a head for delivering the fibers to the mandrel at a predetermined speed and tension via this slot, which is movable in relation to this slot, and
- means for actuating and controlling the means for driving the mandrel and the head for delivering the fibers, as a function of the winding parameters.

Preferably, the furnace includes means for blacking out of the slot for the passage of the fibers, beyond the place for insertion of the fibers.

In one embodiment, these blackout means are constituted by a rule covering the slot, which is mounted slidably along the slot and is driven by a linkage piece that is solidly connected to the fiber-winding head in such a way as to prevent relative displacement, this rule being equipped with a window through which these fibers can pass.

In another embodiment, the blackout means are constituted by juxtaposed individual liftable tongues covering the slot, which are raised during the passage, and by a linkage piece which is solidly connected to the fiber-winding head in such a way as to prevent relative displacement and equipped with a window for the passage of the fibers.

In a further embodiment, the blackout means are constituted by juxtaposed individual tongues mounted to rock around an axis parallel to one of the edges of the slot and retracted by a linkage piece which is solidly connected to the fiber-winding head in such a way as to prevent relative displacement and equipped with a window for the passage of the fibers.

In yet another embodiment, the blackout means are constituted by lips, facing and in contact with one another, of an appropriate flexible material, through which passes a fiber-guiding conduit which is carried by the winding head, the conduit being mounted so as to move parallel to the slot and rotate around an axis which is orthogonal to the axis of the slot, in order to vary the angle formed by the axis of the slot and the guiding conduit passing through the slot.

Because of the displacement of the winding head facing the slot for introducing the fibers into the furnace, which slot can extend along the entire length of the furnace, the apparatus of the invention makes it possible to wind fibers on a mandrel which can be of relatively considerable length without having to oversize the furnace, and also makes it possible to effect windings at deposition angles in relation to the axis of the mandrel that can range from 90°, which corresponds to a circumferential winding, to an angle between 90° and several tens of degrees. The apparatus of the invention makes it possible to wind at angles on the order of ±45°.

The fibers, for example, glass, silica, carbon, SiCO, SiCN, ceramic or other fibers, are wound onto the same mandrel, with or without tension, on the same winding angle or following various angles.

The vitreous or glass-ceramic matrix can be constituted by, for example, at least one oxide of the $SiO_2$, $Al_2O_3$, $ZrO_2$, or $B_2O_3$ type, or by alkaline or alkaline-earth oxides.

Depending on the nature of the matrix, the atmosphere in which the winding and the cooling take place is advantageously a neutral atmosphere, for example nitrogen.

The composite product obtained according to the process can be the desired finished product, with the winding mandrel being sized and configured accordingly, and with this finished product being a tubular object. It can also be a semifinished product, in which case it will subsequently be cut into elements with sizes and shapes that are appropriate to the desired finished product.

In the latter case, the winding mandrel is also configured as a function of the shapes and sizes of the desired finished products.

Other characteristics and advantages will become apparent from the ensuing description of embodiments of the apparatus of the invention, which is given only by way of example, in conjunction with the appended drawings.

BRIEF DESCRIPTION OF THE DRAWINGS

FIGS. 3a to 3e illustrate various embodiments of means for blocking out the slot for the passage of the fibers in the furnace in FIGS. 1 and 2.

DESCRIPTION OF THE PREFERRED EMBODIMENTS

Figures 1, 2:
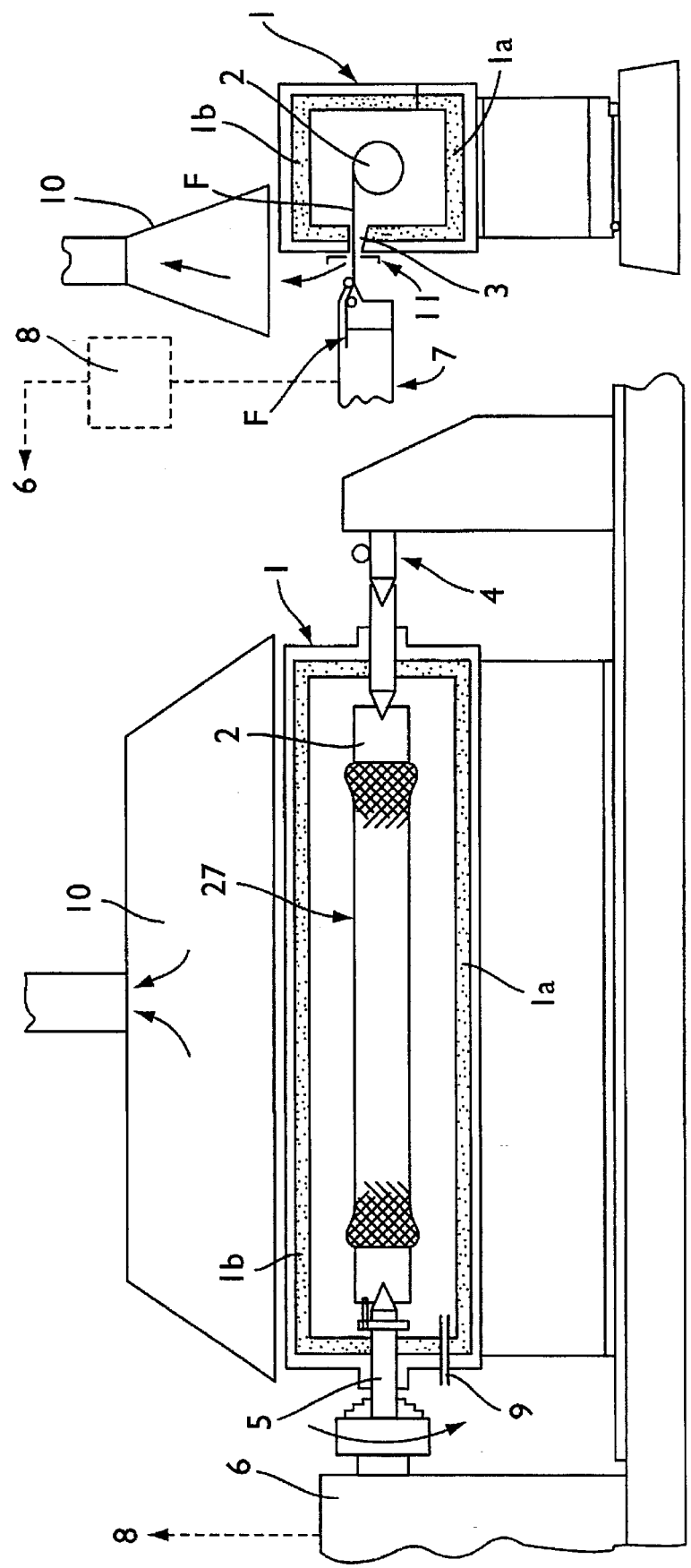
FIG. 1 is a schematic view in vertical axial section of an apparatus according to the invention.
FIG. 2 is a left view of the apparatus in FIG. 1.

FIGS. 1 and 2 represent a furnace 1 with dimensions that are appropriate for receiving a cylindrical mandrel 2 with an elongated shape.

In order to allow insertion of the mandrel 2 into the furnace and its withdrawal, the furnace 1 is approximately constituted by a lower female mold 1a and an upper female mold 1b, which form a parallelepiped rectangle in the plane of the junction in which a passage is disposed on one of the flanks of the furnace, the passage having the form of a straight slot 3 parallel to the mandrel 2 that is in place in the furnace.

The mandrel 2 is held between a headstock 4 and a tailstock 5 driven in rotation by a motor symbolized by 6.

The fibers F are delivered to the mandrel 2, via the slot 3 of passage, by a conventional winding head 7, for example a head with six parallel fibers, which is capable of effecting a winding at a predetermined tension, which can either be zero or adjustable. The head 7 moves in relation to, and at a distance from the slot 3 and is actuated, like the motor 6, by a control station 8, and it controls the winding steps (winding angle, number of layers, tension of the fibers). The means for achieving such a horizontal displacement of a winding head, such as the head 7, are conventional and will not be described in detail.

The furnace 1 is also equipped with means 9 for introducing a neutral gas, for example nitrogen, and with a suction hood 10 for recovering leakage outside the furnace, which is arranged so as to extend along the entire length of the slot 3 perpendicular to it.

Moreover, given the dimensions of the slot 3, a means 11 for blacking out the slot which allows the passage of the fibers F is advantageously provided perpendicular the slot, at any place along the slot.

FIG. 3a, in a fragmentary perspective view, shows a first embodiment of such a means 11, constituted by a sliding metallic rule 12 that overlies the slot 3 while being maintained and guided by slides 13 mounted on the external surface of the furnace 1.

A horizontal window 14 of sufficient size for the passage of the lap of fibers (F) presented by the winding head 7, which moves along the double arrow H, is disposed in the rule 12.

An angle bracket 15 for linking the rule 12 to the head 7 is set facing the window 14 so as to link the displacement of the rule 12 to that of the head, with a view to constantly delivering the fibers (F) opposite the window 14, the piece 15 being equipped with a passage in correspondence with the window.

The rule 12 may be a tape that is automatically wound up and unwound at its two ends.

Figure 3B:
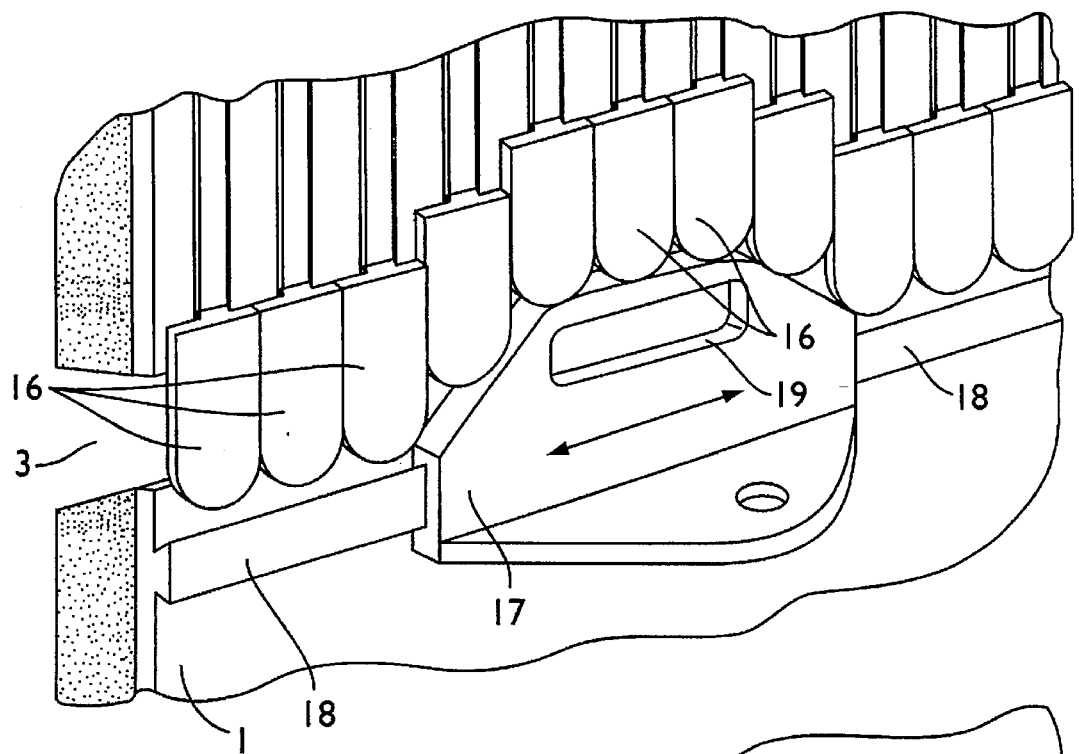

FIG. 3b illustrates another embodiment, in which the blackout means 11 is constituted by a series of juxtaposed tongues 16 which can be raised, are freely mounted, and slide individually along the external surface of the furnace 1 opposite the slot 3.

A piece 17 which moves along a slide rail 18 disposed underneath, and parallel to, the slot 3 has a window 19 facing the slot 3 for the passage of the lap of fibers F (FIG. 3a). Like the piece 15, the piece 17 is linked to the winding head 7 (not shown in FIG. 3b).

The upper edge of the piece 17 is configured in order to slide under the rounded lower edges of the tongues 16, thereby lifting them over the passage so as to permit the introduction of the fibers into the furnace 1 through the window 19 and the slot 3.

Figure 3C:
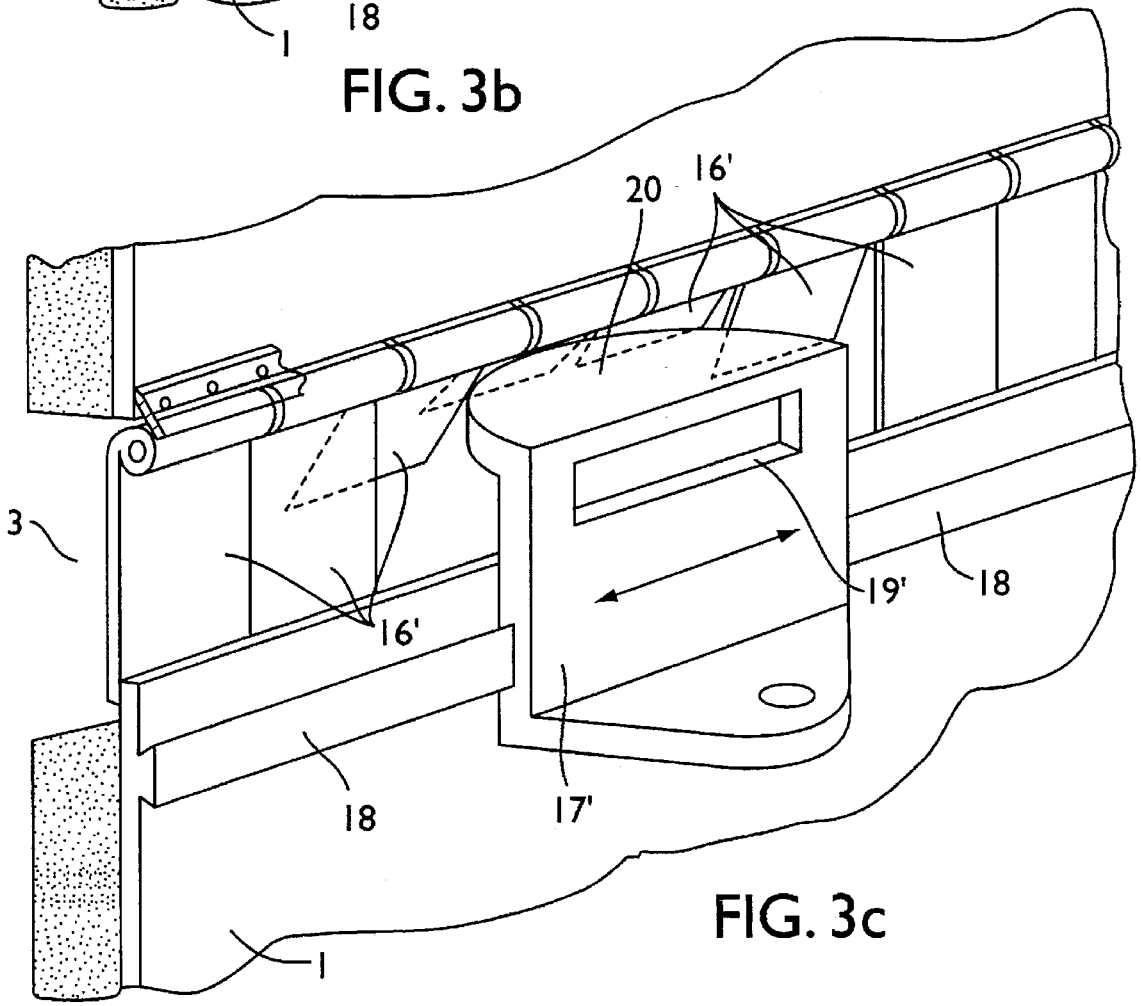

FIG. 3c is a variant of the apparatus in FIG. 3b in which the tongues 16' are mounted individually and tilt freely around an axis that is parallel to the upper edge of the slot 3 and adjacent to this edge.

The piece 17' which moves along the slide rail 18 and is linked to the winding head has a window 19' that is analogous to the window 19, and it controls, by means of a boss 20 turned toward the slot 3, the retraction of the opposing tongues 16' toward the inside of the furnace 1, as it moves along the slot 3.

FIG. 3d illustrates yet another embodiment of the means of blacking out the slot 3 of the furnace 1.

The slot 3 is covered along its entire length by two elements 21a and 21b of ceramic cloth or another flexible insulating material, fixed to the external wall of the furnace by pieces 22. The edges facing the elements are folded into superimposed lips 23 directed toward the inside of the furnace 1, which press elastically against one another.

A flat, hollow conduit-guide 24, one end 24a of which is permanently located inside the furnace and the other end 24b of which is fixed to the winding head 7 can move freely between the lips 23.

The conduit 24 is, for example, ceramic. It is responsible for guiding the fibers F in such a way as to tangent the mandrel 2 in the furnace 1 at an angle of deposition, that is, the angle formed between the fibers F issued from the conduit 24 and the axis A of the mandrel 2, which can vary between 90° (circumferential winding) and an angle less than 90° which can attain ±45°, for example.

To this end, the winding head 7 is mounted so as to pivot around a vertical axis V which is orthogonal to the axis of the slot 3, using means symbolized by 25 which make it possible to pivot the head 7 on the carriage 26, thereby assuring the displacement of the head parallel to the slot 3 along the double arrow H. The means 25 are of course linked to the control station 8 that actuates and controls the winding steps.

In the apparatus of the invention, the mandrel 2 is configured so as to obtain a cylindrical tubular piece made of a fiber composite constituted by a vitreous or glass-ceramic matrix.

The fibers can be of different kinds, for example fibers of SiC, C, $Al_2O_3$, $SiO_2$, and $Si_3N_4$.

The vitreous or glass-ceramic matrix can, for example, be constituted by at least one oxide of the $SiO_2$, $Al_2O_3$, $ZrO_2$, or $B_2O_3$ type, or by alkaline or alkaline-earth oxides.

The fibers F are fibers which are preimpregnated in the known manner with the constituents of the matrix, for example fibers of silicon carbide impregnated with glass powder.

Prior to the winding of the fibers F onto the mandrel 2, the furnace 1 is brought to the desired temperature, which is at least the melting temperature of the constituents of the matrix.

The fibers F are wound onto the mandrel 2 located inside the furnace 1 and driven in rotation by the motor 6, while being paid out at a predetermined tension, which can be zero, the winding head 7 being displaced parallel to the slot 3.

The winding of the fibers F onto the mandrel 2 is performed circumferentially (at a winding angle of 90°) and/or along a winding angle of less than 90° in relation to the axis of the mandrel, depending on the winding parameters (winding angle, number of layers of fibers, tension of the fibers).

The term "fibers" is understood to mean a filament formed by a bundle of unidirectional filaments, or a tape, or several filaments or tapes grouped in parallel and wound simultaneously, from a plurality of supply spools.

During the winding, nitrogen $N_2$ can be permanently introduced into the furnace 1 in order to compensate for the losses due to leakage through the slot 3. A neutral gas of this type is necessary if the fibers F are oxidizable. Preferably, this gas will be heated before its introduction into the furnace in order to avoid any thermal shock.

The temperature inside the furnace is kept constant for the duration of the winding.

This temperature can vary according to the nature of the matrix. In the case of a glass of the "pyrex" type, the temperature of the furnace will be on the order of at least 800° C., for example. For certain types of glass or glass-ceramic, the temperature will reach 1500° C.

The tension of the fibers in the course of winding can be regulated, for example, between 0 and 10 Kg.

In order to obtain a local circumferential deposition onto the mandrel 2, it is driven in rotation around its axis by the motor 6, and the displacement of the winding head 7 parallel to the slot 3 is determined as a function of the pitch of the helicoidal winding of the fibers onto the mandrel.

Because of the displacement of the winding head parallel to the slot 3, the mandrel 2, whatever its length, can be wound in its entirety.

The apparatuses in FIGS. 3a and 3c allow such a circumferential deposition, as well as a deposition at an angle that is slightly less than 90°; this is sufficient to regulate the winding pitch of the fibers F onto the mandrel.

The apparatus in FIG. 3d is used when windings at angles that are substantially less than 90°, for example ±45°, are desired. The orientation of the head 7 around the axis V displaces the conduit 24 in the contact plane of the lips 23 and provides the desired angle of deposition of the fibers F onto the mandrel 2.

In the course of winding, the fibers are pressed in a controlled and regular way onto the subjacent layer which they overlap, and at the same time they are heat treated in conditions of temperature homogeneity and the absence of thermal shock which are propitiate optimal conditions for the ceramicization of the matrix of this piece in the course of the cooling after winding of the piece thus constituted onto the mandrel 2.

In particular, the fibers F are deposited onto the mandrel 2 on a layer of fibers in which the constituents of the vitreous or glass-ceramic matrix are already melted, which achieves good adhesion of the fibers and an optimal compaction of the composite material which is controlled and regular.

As soon as the winding has ended, the furnace is shut off and begins to cool under controlled conditions (duration, cooling speed) so as to obtain an optimal ceramicization of the vitreous or glass-ceramic matrix with respect to the desired characteristics of the composite material.

Control of the cooling is effected by acting on the heating elements of the furnace 1. During the cooling the nitrogen atmosphere is maintained in the furnace. It is potentially possible in the course of the cooling to effect a hardening with the aid of a temperature-controlled fluid, for example nitrogen or another fluid that is compatible with the vitreous or glass-ceramic matrix, which is introduced into the furnace.

In the above mode of implementation, the fibers F are wound onto a cylindrical mandrel 2. This mandrel is for example, made of an appropriate carbon-based, or even a refractory, material coated with colloidal graphite or boron nitride as an unmolding agent.

The profile of the mandrel 2 can be non-circular.

The mandrel 2 can generally have any external surface, for example, cylindrical, spherical, conical, or constituted by a combination of these forms.

The piece wound onto the mandrel 2, symbolized by a sleeve 27 (FIG. 1), can, after machining and finishing, directly constitute a finished piece, but it can also constitute a semifinished product, that is, a product which will later be taken up again for cutting, in order to constitute one or more pieces which can have various configurations and which will be subjected to individual machinings and finishings.

Hence, from one hollow piece 27 wound onto a mandrel 2 of whatever profile, for example, a lenticular profile, it is possible to cut into the wall of this piece a plurality of elements intended to constitute tiles for the thermal protection of the bodies of space missiles during reentry into the atmosphere.

By winding the fibers under tension it will be possible to obtain pieces which have very good mechanical characteristics as well as excellent temperature resistance.

At the end of the cooling process, the mandrel 2 is removed from the furnace 1.

Taking into account the dimensions which the mandrel 2 can have, the female mold 1b may be removed by being articulated on the female mold 1a, for example, and displaced by appropriate lifting means (not shown).

It should be noted that the mandrel onto which the fibers F are wound could be constituted by an existing structure, which could be complex and on which the fiber matrix produced according to the invention would constitute a reinforcing sheath.

Likewise, this mandrel can be replaced by a central core of a piece onto which the fibers F will be wound, a core which will remain in place in the final piece.

In the above two cases, the existing structure or the core forming a winding mandrel must be capable of withstanding the temperatures of the furnace 1.

It should also be noted that the fibers F can potentially be heated before their introduction into the furnace 1, so as to avoid thermal shocks.

Finally, the invention is obviously not limited to the modes of implementation shown and described above, but on the contrary covers all the variants, particularly in relation to the kinds of fibers, the vitreous or glass-ceramic matrices, the winding parameters, the heating and cooling conditions of the furnace 1, the shapes and sizes of the mandrel 2 or its substitute, the conditions for passage through the wall of the furnace by the fibers to be deposited on this mandrel or the like, as well as the means for access to the furnace for the introduction and the withdrawal of the mandrel and the means of blacking out the slot 3 for reducing leakages to the outside. Hence as far as the embodiment of FIG. 3d is concerned, the elements 21a, 21b that form the lips 23 can be replaced by any means which is technically equivalent means, that is, which defines an interface that is impermeable, flexible, and through which the conduit-guide 24, which is movable in the plane of this interface, can pass. The elements 21a, 21b can for example be felt elements or brushes, particularly gasket-brushes.

Moreover, for better thermal insulation and better impermeability, the curtain of lips made by the elements 21a, 21b can optionally be double, as illustrated schematically in FIG. 3e.

This application is related to French Application No. 93 15765, filed Dec. 21, 1993, whose priority is claimed, and the disclosure of which is hereby incorporated by reference in its entirety.

We claim:

1. Apparatus for the fabrication of fiber composites composed of a fiber-reinforced vitreous or glass-ceramic matrix by winding fibers preimpregnated with constituents of the matrix onto a mandrel, said apparatus comprising:
    a furnace comprising a wall and access means for introducing and withdrawing a winding mandrel having an axis;
    means for driving the mandrel in rotation around the axis inside the furnace;
    transit means positioned in the wall of said furnace for delivering fibers into the furnace, said transit means including a slot parallel to the axis of the mandrel;
    means for delivering fibers from supply spools positioned outside the furnace to the mandrel inside the furnace via said transit means, said means for delivering fibers including a head for delivering fibers to the mandrel at a predetermined speed and tension via said slot, said head being movable in relation to said slot;
    means for blacking out said slot at a location beyond insertion of the fibers in said slot; and
    means for actuating and controlling delivery of fibers and driving in rotation of the mandrel comprising elements for actuating and controlling said means for driving the mandrel and said head for delivering the fibers as a function of winding parameters.

2. The apparatus according to claim 1, wherein said means for blacking out said slot comprise a rule covering and slidably mounted with respect to said slot, said rule comprising a window for passage of fibers; and a linkage piece solidly connected to said head for driving said rule in a manner so as to prevent relative displacement between said linkage piece and said head.

3. The apparatus according to claim 1, wherein said means for blacking out said slot comprise a plurality of juxtaposed individual liftable tongues covering said slot; a linkage piece which is solidly connected to said head in a manner so as to prevent relative displacement between said linkage piece and said head, said linkage piece including a window for passage of the fibers; and said tongues being raised during the passage of said linkage piece along said slot.

4. The apparatus according to claim 1, wherein said means for blacking out said slot comprise a plurality of juxtaposed, individual tongues mounted to rock around an axis parallel to an edge of said slot; a linkage piece solidly connected to said head for winding the fibers in a manner so as to prevent relative displacement between said linkage piece and said head, said linkage piece including a window for passage of the fibers; and said tongues being raisable during passage of said linkage piece along said slot.

5. The apparatus according to claim 1, wherein said slot comprises a longitudinal axis and said means for blacking out said slot comprise lips of a flexible material, said lips facing one another and being in contact with one another; a conduit for guiding the fibers passing from said winding head; and said winding head being mounted so as to move parallel to said slot and rotate around a winding head axis which is orthogonal to the axis of the slot, in order to vary an angle formed between the axis of the slot and said guiding conduit passing through said slot.

6. The apparatus according to claim 5, wherein said lips comprise edges folded onto themselves in a direction towards the inside of the furnace.

7. The apparatus according to claim 6, wherein said lips comprise two flexible elements and include edges opposite said two elements comprising gasket-brushes.

8. The apparatus according to claim 5, wherein said lips comprise two flexible elements composed of a cloth or felt.

9. The apparatus according to claim 1, wherein said furnace includes means for controlled introduction of a neutral gas.

10. The apparatus according to claim 9, including means for heating the neutral gas before introduction of the neutral gas into said furnace.

11. The apparatus according to claim 1, wherein said furnace includes a suction device for gases escaping through said slot.

12. The apparatus according to claim 11, wherein said furnace includes means for controlled introduction of a neutral gas.

13. The apparatus according to claim 12, including means for heating the neutral gas before introduction of the neutral gas into said furnace.

14. Apparatus for the fabrication of fiber composites composed of a fiber-reinforced vitreous or glass-ceramic matrix by winding fibers preimpregnated with constituents of the matrix onto a mandrel, said apparatus comprising:
    a furnace comprising a wall and access means for introducing and withdrawing a winding mandrel having an axis;
    means for driving the mandrel in rotation around the axis inside the furnace;
    transit means positioned in the wall of said furnace for delivering fibers into the furnace, said transit means including a slot parallel to the axis of the mandrel;

means for delivering fibers from supply spools positioned outside the furnace to the mandrel inside the furnace via said transit means, said means for delivering fibers including a head for delivering fibers to the mandrel at a predetermined speed and tension via said slot, said head being movable in relation to said slot;

a suction device for gases escaping through said slot; and means for actuating and controlling delivery of fibers and driving in rotation of the mandrel comprising elements for actuating and controlling said means for driving the mandrel and said head for delivering the fibers as a function of winding parameters.

15. The apparatus according to claim 14, wherein said furnace includes means for controlled introduction of a neutral gas.

16. The apparatus according to claim 15, including means for heating the neutral gas before introduction of the neutral gas into said furnace.

17. Apparatus for the fabrication of fiber composites composed of a fiber-reinforced vitreous or glass-ceramic matrix by winding fibers preimpregnated with constituents of the matrix onto a mandrel, said apparatus comprising:

a furnace comprising a wall and access means for introducing and withdrawing a winding mandrel having an axis;

means for driving the mandrel in rotation around the axis inside the furnace;

transit means positioned in the wall of said furnace for delivering fibers into the furnace, said transit means including a slot parallel to the axis of the mandrel;

means for delivering fibers from supply spools positioned outside the furnace to the mandrel inside the furnace via said transit means, said means for delivering fibers including a head for delivering fibers to the mandrel at a predetermined speed and tension via said slot, said head being movable in relation to said slot;

means for actuating and controlling delivery of fibers and driving in rotation of the mandrel comprising elements for actuating and controlling said means for driving the mandrel and said head for delivering the fibers as a function of winding parameters;

means for controlled introduction of a neutral gas; and means for heating the neutral gas before introduction of the neutral gas into said furnace.

* * * * *